United States Patent Office 3,498,967
Patented Mar. 3, 1970

3,498,967
FIBER REACTIVE AZO-DYESTUFFS
René De Montmollin, Riehen, and Arthur Buehler, Rheinfelden, Switzerland, assignors to Ciba Limited, Basel, Switzerland, a company of Switzerland
No Drawing. Filed Sept. 28, 1966, Ser. No. 582,555
Claims priority, application Switzerland, Nov. 16, 1965, 15,760/65
Int. Cl. C09b 62/82, 35/08; D06p 3/12
U.S. Cl. 260—181
8 Claims

ABSTRACT OF THE DISCLOSURE

Fibre-reactive azo dyestuffs of the formula

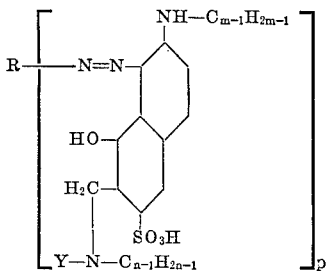

in which R represents the residue of a diazo component of the benzene series which may contain an azo group and which contains negative substituents or, when p stands for 2, it represents the residue of a tetrazo compound, Y represents an aliphatic fibre-reactive acyl residue, m and n each represents a positive integer not greater than 2 and p represents 1 or 2, are suitable for dyeing nitrogenous fibres, for example, leather, silk, polyamides, polyurethanes and especially wool producing level dyeings of very good fastness to washing, milling and to light.

---

The present invention provides fibre-reactive azo dyestuffs of the formula

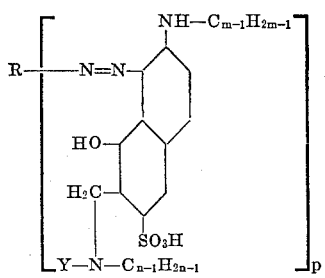

in which R represents the residue of a diazo component of the benzene series which may contain an azo group and which contains negative substituents or, when p stands for 2, it represents the residue of a tetrazo compound, Y represents an aliphatic fibre-reactive acyl residue, m and n each represents a positive integer not greater than 2 and p represents 1 or 2.

Fibre-reactive acyl residues represented by the symbol Y are residues derived from sulphonic acids or preferably from carboxylic acids and may be saturated residues, for example, β-sulphatoethanesulphonyl, β-chloropropionyl, β-bromopropionyl, α,β-dichloropropionyl, α,β-dibromopropionyl and chloroacetyl residues, or unsaturated residues, for example, vinylsulphonyl, chloracylic, bromoacrylic, dichloroacrylic, trichloroacrylic, chlorocrotonyl and acryl residues.

As negative substituents that are present in the diazo residue represented by the symbol R there may be mentioned, in particular, the nitro group, the nitrile group, the sulphonic acid group and sulphone groups, for example, methyl or phenylsulphone groups.

The dyestuffs of the invention can be prepared from the corresponding azo dyestuffs of the formula (2) 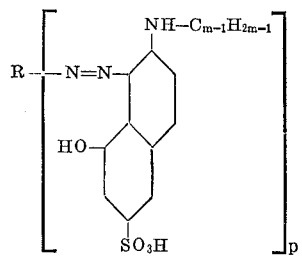

in which p, R and m have the meanings given above, by reaction with N-methylol compounds of aliphatic acid amides in which the acyl residue is fibre-reactive, or by reaction with functional derivatives of the said methylol compounds which react in like manner.

The starting materials of the Formula 2 can be prepared by coupling 2-amino-8-hydroxynaphthalene-6-sulphonic acid, which may be N-alkylated, with tetrazo compounds or with diazo compounds which may contain azo groups, which compounds contain negative substituents.

Examples of amines of which the diazo compound can be used are as follows: aminoazobenzene-monosulphonic acid and disulphonic acid, 1-aminobenzene-2-, -3- or -4-sulphonic acid, 1-aminobenzene-2,5-disulphonic acid, and also diamines that can be tetrazotized, for example, meta- or para-phenylenediamine mono- or di-sulphonic acids and benzidine mono- or di-sulphonic acids, which lead to the production of symmetrical disazo dyestuffs.

It is advantageous to select diazo compounds obtained from amines that do not contain nucleophilic substituents, because otherwise a correspondingly greater amount of methylol compound would have to be used in order to ensure complete acylamido-methylation at 7-position of the γ-acid residue.

The N-methylolamides used as reactants in accordance with the process of the invention are obtainable by the addition of formaldehyde to α- or β-halogen-fatty acid amides or to unsaturated aliphatic acid amides in the presence of basic condensing agents, for example, potassium carbonate or tertiary amines, or in the presence of a mineral acid under mild conditions. It is principally the N-methylol compounds of monochloroacetamide, monobromoacetamide, β-chloro- and β-bromopropionic acid amide, α,β-dichloropropionic acid amide, acrylamide, chloroacrylamide, bromoacrylamide, chlorocrotonic acid amide and the like, that are used in the process of the present invention.

Condensation of the dyestuffs with the methylol compounds is carried out in the presence of acidic condensing agents or dehydrating agents that act as condensing agents. Substances of the kind defined that are principally used are concentrated hydrochloric acid, zinc chloride, phosphorus pentoxide, acetic anhydride, syrupy phosporic acid, mixtures of aluminium chloride and pyridine, and oleum. However, the preferred condensing agent is concentrated to anhydrous sulphuric acid, since, in most cases, it can also be used as solvent for the reactants. The reaction temperature may vary within wide limits and depends mainly on the type of condensing agent and dyestuff used. The reaction in concentrated sulphuric acid generally proceeds at 0 to 10° C. and is both rapid and complete. In some cases it is necessary to carry out the reaction at a higher temperature, for example, at 15 to 80° C. However, in this case it is essential that the reactants are not destroyed under these conditions and to ensure that sulphonation of the reaction product which may occur is not undesirable. The finished reaction products are precipitated by pouring the sulphuric acid solutions or suspensions into iced water and are then isolated in the usual manner.

The N-methyolamides can be replaced by reactive functional derivatives of the said methylol compounds provided they react in the same manner. For example, use may be made of the esters obtained by treating the methylol compounds with inorganic or organic acids or acid halides or anhydrides; also suitable the the di-(fatty acid amidomethyl)-ethers obtainable by autocondensation in the presence of, for example, phosphorus oxychloride. However, since, these functional derivatives have to be prepared from the methylol compounds, the first process is preferred. However, it is possible to produce the desired products with these derivatives, especially with the N-chloromethylamides, in certain cases where the Einhorn method yields unsatisfactory results. In some cases the process of the invention can be simplified in that a mixture of formaldehyde and the acid amide is reacted with the dyestuff in a single-step process instead of using prepared methylol derivatives of the amides as starting materials.

A modified version of the process for manufacturing the dyestuffs consists in dissolving the acid amide in concentrated sulphuric acid, adding a dihalogen-dimethylether to the solution and then allowing the dyestuff to react in this reaction mixture at a temperature of 5 to 30° C. The acylamido-methylated dyestuff is isolated in the manner described above.

Furthermore, the dyestuffs of the invention, which contain an unsaturated acyl residue, for example, an acrylic, chloroacrylic or bromoacrylic residue, can also be prepared from the corresponding halogenated fatty acid derivatives, for example, from dyestuffs which contain a $\beta$-chloropropionyl, $\alpha,\beta$-dichloro- or dibromo-propionyl residue, by elimination of hydrogen halide by means of substances having an alkaline reaction.

The dyestuffs of the invention can also be prepared by coupling. In this process, diazo or tetrazo compounds prepared from the above-mentioned amines are coupled in a neutral to slightly acid medium with a coupling component of the formula

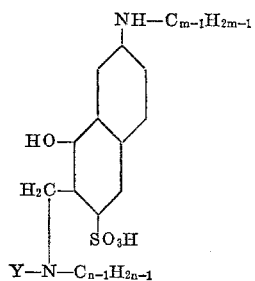

in which $m$, $n$ and Y have the meanings given above.

To prepare the compounds of the Formula 3, $\gamma$-acid or an N-alkyl-$\gamma$-acid is reacted with N-methylol compounds of aliphatic acid amines in which the acyl residue is fibre-reactive or with functional derivatives of the said methylol compounds which react in like manner. Reaction with the methylol compounds mentioned above is carried out in the presence of acidic condensing agents or in the presence of dehydrating agents which react like acidic condensing agents. The reaction is advantageously carried out in concentrated sulphuric acid at a temperature of 0 to 30° C.

The dyestuffs obtainable by the process of the invention, especially those having not more than two acidic groups imparting solubilty in water, are suitable for dyeing nitrogenous fibres, for example, leather, silk, polyamides, polyurethanes and especially wool. They produce very level dyeing on these fibres when applied in an aqueous acidic solution. Many of these dyestuffs, provided they contain not more than one sulphonic acid group, display high affinity for the said nitrogenous materials in a slightly acid to neutral bath and are thus absorbed by them readily. The dyeings obtained, especially dyeings on wool, are distinguished by their uniformity and a very good fastness to washing and milling, especially alkaline milling. Furthermore, the dyeings often display a good fastness to light.

Dyestuffs suitable for dyeing cellulosic materials are, in particular, those containing two to four sulphonic acid groups in the dyestuff molecule. They can be used for dyeing cellulose by the so-called pad-dyeing process in which the material is impregnated with an aqueous dyestuff solution which may contain salt and the dyestuff or dyestuffs are fixed on the material by treatment with an alkali, preferably with the application of heat. The process and the direct dyeing process, by which many of the disazo dyestuffs obtainable by the process of the invention can be applied, yield dyeings which, as a rule, are distinguished by a good fastness to light and especially by excellent properties of wet fastness.

The dyestuffs can also be used to produce valuable and fast prints on cellulosic fibers when they are fixed on the material by a heat treatment in the presence of an alkali.

Subsequent to dyeing or printing it is generally advantageous to remove as much unfixed dyestuff as possible. To this end, the dyeings or prints are thoroughly rinsed in warm and cold water and subjected to a soaping process in the presence of a non-ionic dispersing and/or wetting agent.

The following examples illustrate the invention. Unless otherwise stated, the parts and percentages are by weight.

EXAMPLE 1

120 parts of 2-amino-8-naphthol-6-sulphonic acid are dissolved at 20 to 25° C. in 900 parts of 96% sulphuric acid while stirring. The solution is cooled to 0 to 5° C. and 131 parts of N-methylol-$\alpha,\beta$-dibromopropionic acid amide are added in a manner such that the temperature does not rise above 5° C. Stirring is continued for 5 hours at that temperature and then the reaction mixture is discharged on to 2,000 parts of ice to which 140 parts of sodium chloride has been added; 2-amino-8-naphthol-7-($\alpha,\beta$ - dibromopropionyl) - aminomethyl-6-sulphonic acid precipitates. The precipitate is isolated by filtration and washed with a 5% sodium chloride solution until it reacts almost neutral to Congo paper. The filter residue so obtained is suspended in 1,000 parts of water, the pH of the suspension is adjusted to 3.0 to 3.5, and the batch is stirred for 3 hours at 70 to 80° C. The batch is allowed to cool to room temperature while stirring, filtered, the filter residue is washed with a 5% sodium chloride solution until the washings react neutral to Congo paper, and the residue is then dried at 70 to 80° C. About 260 parts of 2 - amino-8-naphthol-7-($\alpha,\beta$-dibromopropionyl)-aminomethyl-6-sulphonic acid of 81% concentration according to the nitrite titre are obtained; the product is no longer capable of coupling in ortho-position to the hydroxyl group.

N - methyl-2-amino-8-naphthol-7-($\alpha,\beta$-dibromopropionyl)-aminomethyl-6-sulphonic acid can be obtained in an analogous manner in good yield from N-methyl-2-amino-8-naphthol-6-sulphonic acid.

20.3 parts of 5-methoxy-2-aminobenzene-1-sulphonic acid in the form of the sodium salt are dissolved in 200 parts of water. 6.9 parts of sodium nitrite are added to the solution and the whole is added dropwise at 0 to 5° C. to a mixture of 25 parts by volume of 30% hydrochloric acid and 100 parts of ice while stirring. The suspension is stirred for one hour and then the excess nitrous acid is destroyed. The diazo suspension is then run into a suspension of 48.2 parts of 2-amino-8-hydroxy-7-($\alpha,\beta$-dibromopropionyl-aminomethyl) naphthalene-6-sulphonic acid in 500 parts of water and 100 parts by volume of a 4 N sodium acetate solution while stirring. Coupling starts immediately and is soon complete. The dyestuff so obtained is completely precipitated by the addition of sodium chloride, isolated by filtration, washed with a sodium chloride solution and dried in vacuo at 70 to 80° C.

A red powder is obtained which dyes wool red tints possessing very good properties of fastness.

EXAMPLE 2

42.3 parts of the dystuff obtained by the acid coupling of diazobenzene-2-sulphonic acid with 2-amino-8-naphthol-6-sulphonic acid are dissolved at 20 to 25° C. in 450 parts of 96% sulphuric acid. The solution is cooled to 0 to 5° C. and 26.1 parts of N-methylol-α,β-dibromopropionic acid amide are added in a manner such that the temperature does not rise above 5° C. Subsequently, the batch is stirred for 20 hours at 0 to 5° C. The reaction mixture is then discharged on to about 400 parts of ice, the whole is stirred for 30 minutes, filtered, and the filter residue is washed with a small amount of water. The residue is taken up in 400 parts of water, the batch is adjusted to pH 3 with sodium hydroxide solution, stirred for 2 hours at 70 to 80° C., cooled to room temperature, neutralized to pH 6 to 7 with sodium hydroxide solution, the product is precipitated by the addition of sodium chloride, isolated by filtration, washed with sodium chloride solution and dried in vacuo at 70 to 80° C.

A red powder is obtained which is soluble in water and which dyes wool in an acetic acid solution scarlet tints which are fast to wet treatments and to light.

A similar dyestuff which dyes wool red tints fast to wet treatments and to light is obtained by using 12.4 parts of N-methylolchloracetamide or 10.1 parts of N-methylolacrylamide instead of 26.1 parts of N-methylol-α,β-dibromopropionamide.

Similar dyestuffs are obtained when diazo compounds prepared from the amines listed in Column I are either (a) coupled with the reaction products of the methylolamides listed in Column III and the coupling components in Column II or (b) first coupled with the coupling components listed in Column II and the resulting dyestuff subsequently condensed with the methylol compounds indicated in Column III.

The following table indicates further reactive dyestuffs of the formula

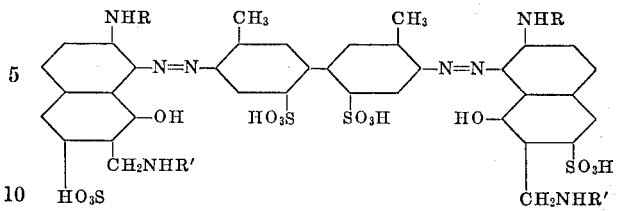

which are obtainable by this method. The residues represented by the symbols R and R' are indicated in Columns (I) and (II) below, and the tints produced with aqueous solutions are listed in Column (III).

| R | R' | Tint |
|---|---|---|
| (I) | (II) | (III) |
| Methyl | α,β-Dibromopropionyl | Bluish red. |
| Do | Acryloyl | Do. |
| Do | Chloroacetyl | Do. |
| H | do | Red. |
| H | Acryloyl | Red. |
| H | α-Bromoacryloyl | Red. |

Dyeing prescription 100 parts of wool knitting yarn are entered at 50 to 80° C. into a dyebath consisting of 10 parts of sodium sulfate crystals, 6 parts of 40% acetic acid, 0.5 part of the addition product produced from oleylamine and ethylene oxide described below, 2 parts of the dyestuff described in Example 2 and 3,000 parts of water. The dyebath is brought to the boil in half an hour and dyeing is continued at the boil for one hour. The wool is then rinsed and dried.

Preparation of the ethylene oxide addition product 1 part of finely divided sodium is added to 100 parts of commercial oleylamine, the batch is heated to 140° C. and ethylene oxide is introduced at 135 to 140° C. As soon as the ethylene oxide is quickly absorbed, the reac-

| I | II | III | Tint of wool |
|---|---|---|---|
| 1-aminobenzene-2-sulphonic acid. | N-methyl-2-amino-8-naphthol-6-sulphonic acid. | N-methylol-α,β-dibromopropionic amide. | Bluish red. |
| 1-aminobenzene-2,5-disulphonic acid. | do | do | Do. |
| Do | 2-amino-8-naphthol-6-sulphonic acid. | do | Red. |
| 2-amino-4'-methyl-1,1'-diphenylsulphone. | do | N-methylolchloroacetamide. | Red. |
| 2-aminobenzene-1-methylsulphone. | do | N-methylolacrylamide | Red. |
| 1-aminobenzene-2-sulphonic acid. | do | N-methylol-α,β-dichloropropionic amide. | Red. |

EXAMPLE 3

18.6 parts of 4,4'-diamino-5,5'-dimethyl-1,1'-diphenyl-2,2'-disulphonic acid are dissolved in 50 parts of water in the presence of approximately 13.6 parts of 30% sodium hydroxide solution. 6.9 parts of sodium nitrite are added and the solution is allowed to run into a solution of 27 parts of 30% hydrochloric acid in 200 parts of water at a temperature of 0 to 15° C. A suspension of 48.2 parts of 2-amino-8-hydroxy-7-(α,β-dibromopropionyl)-aminomethyl-naphthalene-6-sulphonic acid in 500 parts of water and 100 parts of a 4 N sodium acetate solution is added to the tetrazo compound. Coupling starts immediately and is completed after a short time. The dyestuff so obtained is precipitated by the addition of sodium chloride, isolated by filtration, washed with a solution of sodium chloride and dried in vacuo at 70 to 80° C.

A red powder is obtained which dyes wool red tints possessing very good properties of fastness.

tion temperature is reduced to 120 to 125° C. and the introduction of ethylene oxide is continued until 113 parts have been absorbed. The reaction product so obtained gives a practically clear solution in water.

With the dyestuffs having only one sulphonic acid group wool may be dyed also without the use of ethylene oxide addition products.

EXAMPLE 4

40.4 parts of 2-amino-5-acetamino-4'-methyl-1,1'-diphenylsulphone are stirred in 250 parts of water with the addition of 40 parts of a 30% solution of naphthalene-1-sulphonic acid and diazotised at 10 to 15° C. by the dropwise addition of 25 parts by volume of a 4 N sodium nitrite solution. The batch is stirred for one hour and any excess nitrous acid still present is destroyed. The diazo suspension is then allowed to run into a suspension of 48.2 parts of 2-amino-8-hydroxy-7-(α,β-dibromopropionyl-aminomethyl)-naphthalene-6-sulphonic acid in 500 parts of water and 100 parts by volume of a 4 N sodium acetate solution, with stirring. Coupling begins immediately and is terminated after a short time. The precipitated dyestuff is filtered tal. qual, washed with a 2% sodium chloride solution and dried in vacuo at 70 to 80° C., to yield a dark powder which dyes wool bordeaux-red tints which have very good fastness properties.

What is claimed:

1. A fiber-reactive azo dyestuff of the formula

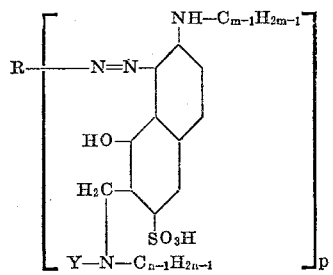

in which p represents a whole positive number up to and including 2, R is selected from the group consisting of a sulfonic acid substituted phenyl, methyl-$SO_2$-substituted phenyl, sulfonic acid substituted diphenyl, sulfonic acid substituted diphenyl substituted with methyl, phenyl-$SO_2$-phenyl and phenyl-$SO_2$-phenyl substituted by a member selected from the group consisting of methyl and acetylamino, Y is a member selected from the group consisting of acryloyl, β-chloropropionyl, β-bromopropionyl, α,β-dichloropropionyl, α,β - dibromopropionyl, chloroacetyl, chloroacrylic, bromoacrylic, dichloroacrylic, trichloroacrylic, chlorocrotonyl, m and n each represents a positive integer not greater than 2.

2. A dyestuff as claimed in claim 1, wherein Y represents a member selected from the group consisting of the chloroacetyl, α,β-dichloro- and bromopropionyl, acryloyl, chloroacryloyl and bromoacryloyl and β-chloropropionyl groups.

3. A dyestuff as claimed in claim 1, which corresponds to the formula

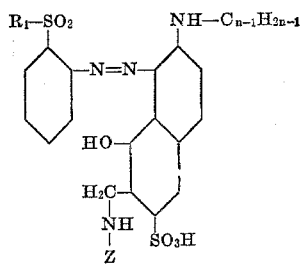

in which Z represents a member selected from the group consisting of the chloroacetyl, α,β-dichloro- and bromopropionyl, acryloyl, chloroacryloyl and bromoacryloyl and β-chloropropionyl groups, n represents a whole positive number up to and including 2 and $R_1$ represents a member selected from the group consisting of the methyl-, phenyl and hydroxyl groups.

4. The dyestuff as claimed in claim 1, which corresponds to the formula

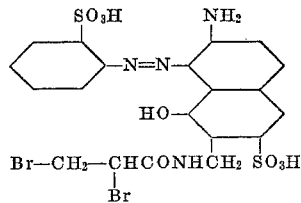

5. The dyestuff as claimed in claim 1, which corresponds to the formula

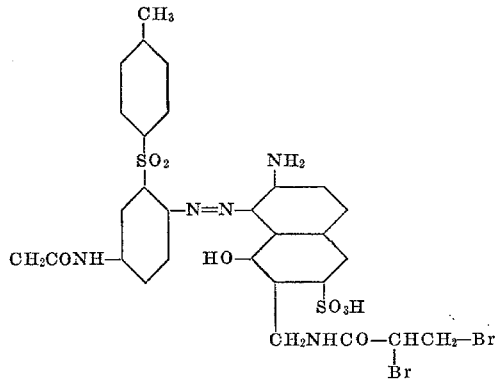

6. The dyestuff as claimed in claim 1, which corresponds to the formula

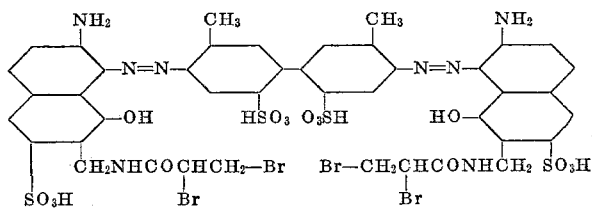

7. The dyestuff as claimed in claim 1, which corresponds to the formula

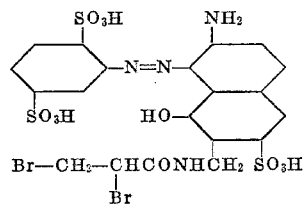

8. The dyestuff as claimed in claim 1, which corresponds to the formula

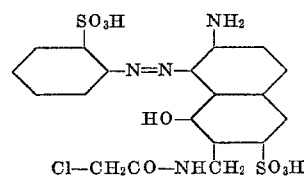

No references cited.

FLOYD D. HIGEL, Primary Examiner
DONALD M. PAPUGA, Assistant Examiner

U.S. Cl. X.R.
8—41, 54; 260—199, 198

UNITED STATES PATENT OFFICE
CERTIFICATE OF CORRECTION

Patent No. 3,498,967              Dated March 3, 1970

Inventor(s)  René De Montmollin et al.

It is certified that error appears in the above-identified patent and that said Letters Patent are hereby corrected as shown below:

Column 8, claim 5, the lower left hand side of the formula should appear as shown below:

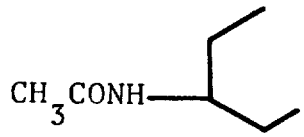

Signed and sealed this 13th day of April 1971.

(SEAL)
Attest:

EDWARD M. FLETCHER, JR.                WILLIAM E. SCHUYLER, JR.
Attesting Officer                       Commissioner of Patents